United States Patent [19]

Winner et al.

[11] Patent Number: 4,487,860

[45] Date of Patent: Dec. 11, 1984

[54] AQUEOUS SELF-CURING POLYMERIC BLENDS

[75] Inventors: Peter P. Winner, North Royalton; James T. K. Woo, Medina, both of Ohio

[73] Assignee: SCM Corporation, New York, N.Y.

[21] Appl. No.: 558,292

[22] Filed: Dec. 5, 1983

[51] Int. Cl.$^3$ .......................... C08L 63/00; C09D 5/02
[52] U.S. Cl. .................................... 523/408; 523/100; 523/402; 523/406
[58] Field of Search ................ 523/100, 402, 406, 408

[56] References Cited

U.S. PATENT DOCUMENTS

| 4,212,781 | 7/1980 | Evans et al. | 525/63 |
| 4,218,356 | 8/1980 | Evans et al. | 524/811 |
| 4,316,922 | 2/1982 | Perine et al. | 523/417 |

*Primary Examiner*—Ronald W. Griffin
*Attorney, Agent, or Firm*—Thomas M. Schmitz

[57] ABSTRACT

The composition comprises an aqueous polyelectrolyte polymer intermixed with a phosphated polymer and a self-curing water dispersed polymer containing copolymerized functional monomer and alkylol acrylamide monomer. The polyelectrolyte polymer is produced by copolymerizing ethylenically unsaturated monomers, including hydroxyl or carboxyl monomers in the presence of an ionizing agent.

18 Claims, No Drawings

AQUEOUS SELF-CURING POLYMERIC BLENDS

BACKGROUND OF THE INVENTION

This relates to copending Ser. No. 407,428 filed Aug. 12, 1982, now abandoned, and Ser. No. 468,364 filed Feb. 22, 1983, and the same are incorporated herein by reference.

This invention relates to polymeric compositions and processes particularly useful in surface coating compositions, and more particularly pertains to aqueous blends containing certain reactive self-curing water-dispersed polymers, certain water dispersed polyelectrolyte polymers, and preferably containing a polymeric phosphate additive, to provide useful water-based coating compositions for interior beverage and food containers and similar sanitary coating applications.

Water-based coating compositions for use as internal sanitary liners for metal containers are suggested in U.S. Pat. No. 3,991,216. Such polymers are based on interpolymers of copolymerized acrylamide monomer, carboxylic monomer, and other ethylenically unsaturated monomers. However, such polymers are difficult to spray and often exhibit deficient film properties such as lack of resistance to ethanol and hence are undesirable for containers for alcoholic beverages.

It now has been found that certain reactive self-curing water dispersed polymers blended with an aqueous polyeletrolyte and a phosphated polymer provides an excellent sprayable coating suitable for an interior coating for beverage and food containers. The polyelectrolyte polymer is a resinous copolymer polyelectrolyte produced by polymerizing ethylenic addition polymerizable monomers, including carboxyl or hydroxyl monomers, in an aqueous medium containing an ionizing agent. The reactive self-curing water-dispersed polymer contains copolymerized monomers including functional carboxyl, hydroxyl, amine, or amide monomers in combination with alkylol acrylamide monomers. The monomers preferably are polymerized in a step-wise reaction to concentrate the alkylol acrylamide on the surface of the water dispersed polymer particles to provide an improved stabilized water-dispersed polymer exhibiting surprisingly good rheological properties including viscosity, stability and spray application. By concentrating alkylol acrylamide on the polymer surface and by polymerizing at temperatures preferably above 70° C., it is believed that a minor amount of alkylolacrylamide reacts with a minor amount of functional monomer during the addition polymerization of ethylenic monomers to provide a relatively rigid or hard polymer particle surface, which apparently stabilizes the viscosity of the water-dispersed blend as well as provide considerable shear resistance during subsequent spray application of the polymeric blend. Preferred water dispersed polymers are emulsion polymers. Upon ultimately heat curing of the composition of this invention, the self-curing water-dispersed polymer becomes self-curing by the alkylol acrylamide reacting with the functional monomer groups in the polymer. By blending the reactive self-curing water-dispersed polymer with an aqueous polyelectrolyte polymer, the blend provides an excellent sprayable interior coating particularly suitable for beverage cans. A preferred polymeric blend in accordance with this invention contains an aqueous dispersed phosphated polymer. Preferred phosphated polymers are epoxy phosphate polymers. The inclusion of phosphated polymer provides improved coating characteristics such as solvent resistance and improved porosity properties. The polymeric composition of this invention provide improved viscosity, stability, improved mechanical stability, and surprisingly good rheological properties including spray application. Coatings based on the polymeric composition exhibit high molecular weight, high solids, minimal use of solvents, good spray application as well as forming films having good film integrity properties. These and other advantages of this invention will become more apparent by referring to the detailed description of the invention and the illustrative examples.

SUMMARY OF THE INVENTION

Briefly, the invention is based on a certain self-curing water dispersed polymer in combination with an aqueous polyelectrolyte. The water dispersed polymer is produced by polymerizing ethylenic monomers, including functional carboxyl, hydroxyl, amine or amide monomers in combination with alkylol acrylamide monomers, and thereafter blending the water-dispersed polymer with the polyelectrolyte copolymer and preferably with a phosphated polymer. The polyelectrolyte copolymer is produced by copolymerizing ethylenic addition monomers, including carboxyl or hydroxyl monomers, in water containing an ionizing agent. The composition of this invention comprises a water-dispersed polymeric blend of (a) between 5% and 99% the reactive self-curing water dispersed polymer, and (b) 1% and 70% polyelectrolyte copolymer. The preferred combination further contains (c) between 3% and 20% phosphated polymer. An aminoplast cross-linking resin can be added to the water-dispersed polymeric blend to provide improved curing properties.

DETAILED DESCRIPTION OF THE INVENTION

In accordance with this invention, the composition comprises certain reactive self-curing water dispersed polymers blended with an aqueous polyelectrolyte copolymer, preferably including a phosphated polymer, and an aminoplast cross-linking resin.

Referring first to the reactive self-curing water dispersed polymer, the reactive self-curing polymer is a water dispersed polymer containing copolymerized ethylenically unsaturated monomers comprising (i) alkylol acrylamide and preferably alkylated alkylol acrylamide monomers, (ii) functional monomers consisting of reactive carboxy, hydroxyl, amine, or amide monomers, and (iii) other ethylenically unsaturated monomers to produce self-reactive alkylol acrylamide water dispersed polymer. The self-curing water dispersed polymer preferably is synthesized by stepwise polymerization of monomers in water by first polymerizing a portion of the ethylenic monomers to form a core, and then polymerizing the remaining monomers including the alkylol acrylamide monomers in the second polymerization step. Thus, the polymer particles contain polymerized alkylol acrylamide preferentially orientated on the surface of the polymer particles, whereby the water dispersed polymers are self-curing. The two stage monomers can be proportioned on a weight basis from 25/75 to 75/25 first stage/second stage monomers. Preferably, the second stage should contain monomers already included in the first stage, plus 3–15% alkylol acrylamide derivative based on total monomer in both stages. Preferably, monomer composition of the two stages are similar, particularly with respect to the carboxyl monomer level and the polymer Tg, which will insure compatability between the two monomer stages and preclude unnecessary agglomeration during synthesis.

The alkylated alkylol acrylamide monomers can be derivatives of acrylamide methacrylamide, methylol acrylamide, or similar alkyl modified acrylamide monomer as shown for example in U.S. Pat. Nos. 3,991,216; 4,097,438; and 4,305,859. The acrylamide monomers preferably are alkylated with an alkyl group such as methyl, ethyl, propyl, n-butyl, or iso-butyl, and similar alkylated alkylol acrylamide monomers, wherein the butylated monomers are preferred. Functional monomers include carboxyl, hydroxyl, amino, and amido functional group containing monomers. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. Reactive monomers further include N-methylol acrylamide or methacrylamide monomers. The remaining other ethylenically unsaturated monomers that can be copolymerized with the alkylol acrylamide monomer and functional monomers to form a reactive water dispersed polymer, comprise vinyl, vinylidene, acrylic, allylic and unsaturated mono or dicarboxylic acids. Vinyl monomers include, for example, vinyl esters such as vinyl acetate, vinyl proprionate, vinyl butyrates, vinyl benzoate, isopropenyl acetate and simlar vinyl esters; and vinyl halides such as vinyl chloride. Vinyl aromatic hydrocarbon monomers can include, for example, styrene, methyl styrenes and similar alkyl styrenes, chlorostyrene, vinyl toluene, vinyl naphthalene, divinyl benzene, diallyl phthalate and similar diallyl derivatives. Vinyl aliphatic monomers include olefinic unsaturated monomers such as butadiene, substituted butadienes, cyclopentadienes, dicyclopentadiene cyclohexane, and vinyl naphthalene. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The reactive self-curing alkylol acrylamide water dispersed copolymer preferably is a copolymer prepared by copolymerizing the ethylenically unsaturated monomers in water by two step polymerization described above through free radical induced polymerization using peroxy or azo catalyst, common redox catalyst, ultraviolet radiation or the like. Free radical initiators for example include various peroxygen compounds such as persulfates, benzoyl peroxide, t-butyl hydroperoxide, cumene hydroperoxide, and similar peroxide catalysts. Azo compounds include for example azo bis-isobutyronitrile and dimethylazobis-isobutyrate. Initiating systems further include alkali metal persulfate or ammonium persulfate with or without a reducing substance adapted to activate the persulfate. The initiators or catalysts ordinarily are used at a level of about 0.1% to 1% by weight of monomers. The resulting self-curing water dispersed polymer contains by weight between 1% and 20% copolymerized alkylol acrylamide monomer, between 1 and 20% reactive carboxyl, hydroxyl, amine or amide monomer, and the remaining being other ethylenically unsaturated monomers.

Water dispersed polymers preferably are emulsion polymers produced by emuslion polymerization in the presence of an emulsifier although similar aqueous polymerization processes can be used. Most preferred polymers are latex polymers. The two monomer stages are sequentially emulsion copolymerized during 6–8 hours at temperatures above 70° C. and preferentially between 70°–80° C. utilizing standard semi-continuous methodology. Monomer conversion is routinely above 99.8% and the final non-volatile content is usually 45–55%. The preferred particle size is 2000–4000 Å for optimum spray performance, although this range can be expanded for other application purposes up to about 10,000 Å since particle size has been found to have little effect upon coatings performance. Polymer Tg is important for spray application characteristics and the Tg should be between about 0° C. and 70° C.

Referring next to the aqueous polyelectrolyte copolymer, the polyelectrolyte is an aqueous dispersion of resinous polyelectrolyte produced by copolymerization of ethylenically unsaturated monomers in water containing an ionizing agent to produce an aqueous resinous polyelectrolyte polymer as described in U.S. Pat. No. 4,218,356. The polyelectrolyte is produced by aqueous copolymerization of the ethylenic monomers, including ionizable functional monomers such as carboxyl or hydroxyl monomers in the presence of ionizing agent. The ionizer for carboxylic acid groups should be a base, advantageously a water soluble one such as ammonia, an aliphatic, aromatic, or heterocyclic mono or polyamine, an alkanolamine, an alkali or alkaline earth metal hydroxide such as potassium sodium, lithium or calcium hydroxide, or the like. The amines can be primary, secondary or tertiary, preferably monofunctional, amines. Also possible bases include quaternary ammonium hydroxides, hydrazines, and hydroxylamines. Ionizers for a cationic resinous polyelectrolyte are acid, preferably a carboxylic acid such as lactic, acetic, formic, or even a inorganic mineral acid such as hydrochloric acid, phosphoric acid, sulfuric acid or the like.

Polymerizable ethylenically unsaturated monomers for producing the polyelectrolyte contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon moners include alpha olefins such as ethylene, propylene, isobutylene, and cyclohex as well as conjugated dienes such 1,3-butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isoproptyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids. Carboxyl groups can be introduced into the polymer with acrylic acid including acrylic and methacrylic acid, ethacrylic acid, alpha-chloroacrylic acid, alpha-cycanoacrylic acid, crotonic acid, beta-acryloxy propionic acid, and beta-styryl acrylic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydro-muconic acid as well as esters of such acids. Hydroxyls can be introduced into the polymer by hydroxylated monomers such as hydroxyl alkyl acrylates and methacrylates such as hydroxyethyl and hydroxypropyl acrylates and methacrylates. Preferred carboxy containing monomers include acrylic acid and lower alkyl substituted acrylic acids wherein the preferred carboxylic monomers are acrylic and methacrylic acids. Preferred hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. The polyelectrolyte polymer contains on a weight basis between about 5% and 35% hydroxyl or carboxyl monomer.

The polyelectrolyte can be produced by reacting the ethylenic monomers in the presence of water containing the ionizing agent. At least about 20% and preferably between 25% and 40% of the ionizable functional groups are ionized in the resulting polymer. The polymer should contain at least about 0.0001 equivalents of ionizable groups per gram of reactants. The ionizing agent is added to the aqueous polymerization medium prior to copolymerization of the monomers or can be added concurrently with the monomers. The monomers are copolymerized in an aqueous medium although it is advantageous to add small amounts of a solvent for the monomers such as isopropanol, 2-butoxy-ethanol-1, methyl isobutyl ketone, isophorone at levels of between about 5% and 30% based on the weight of water plus solvent. Addition polymerization of the monomers can be above 25° C. and preferably between 25° C. and 100° C. Polymerization typically takes 3 to 6 hours.

Referring next to the preferred inclusion of a phosphated polymer in the polymeric blend of this invention, the phosphated polymer can include for example, mono- and di-alkyl esters of phosphoric acid, phosphated epoxidized oil, phosphated epoxidized polybutadiene copolymers, phosphated acrylic copolymers, phosphated polyesters, phosphated copolymers containing copolymerized phosphate monomer, epoxy phosphate, and phosphated epoxy-acrylic copolymer.

The preferred phosphated polymer is a phosphated epoxy polymer and comprises epoxy resin coreacted with phosphoric acid to produce a phosphated epoxy ester polymer. The phosphated epoxy polymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about 1 mole of phosphate whereas a mole of a diepoxide polymer can contain up to 2 moles of phosphate. On a weight basis, the phosphated epoxy polymer contains between about 0.05% and 5%, and preferably between 0.1% and 3% coreacted phosphoric acid measured as phosphate, although excess molar amounts of phosphate reactant in any appreciable amount is undesirable. The epoxy polymer used for preparing the phosphated epoxide can be epoxy polymers having a molecular weight greater than 200 and up to about 10,000 and preferably between about 400 and 8,000. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 2 and 25 monomer units and preferably between 3 and 20 copolymerized monomer units (bisphenol-A) wherein the epoxy polymer can be either a mono- or diepoxide polymer. The phosphated epoxide polymer can be synthesized by heating a solution of epoxy resin dispersed in a suitable solvent such as methyl ethyl ketone or 2-butoxy ethanol and then reacted with phosphoric acid or preferably polyphosphoric acid at reflux temperatures of 120° C. to 145° C. for sufficient time, typically 2 to 5 hours, to completely react the phosphoric acid with available epoxide groups. The preparation of epoxy phosphate resins are shown in U.S. Pat. Nos. 4,289,812 and 4,316,922. The epoxy phosphate can be prepared from a single epoxy resin or from a mixture of epoxy resins. In a further variation of this aspect of the invention, the epoxy phosphate polymer can be produced by reacting a non-phosphated epoxy resin with an epoxy resin containing higher levels of phosphate, provided that the resulting epoxy resin mixture contains between about 0.05% and 5% by weight coreacted phosphoric acid. For instance, a weight ratio of 9 parts non-phosphated epoxy resin mixed with 1 part phosphated (10%) epoxy resin coreacted together at temperatures above 120° C. for at least 2 hours provides a phosphated epoxy polymer containing 1% coreacted phosphoric acid in accordance with this invention. In practice, the non-phosphated epoxy resin is reacted with phosphated (10%) epoxy resin at sufficiently high temperatures for time sufficient to convert the mixture to predominately a monophosphate, which can be enhanced by the addition of 2% water based on solids to hydrolyze the phosphated mixture and preferably convert the mixture to a predominately monophosphated epoxy resin. The phosphated epoxy polymer containing between 0.05% and 5% coreacted phosphoric acid in accordance with this invention then can be dispersed into an amine and water mixture by mechanical mixing. The resulting aqueous dispersed epoxy phosphate can be added to the epoxy-acrylic copolymer and the self-curing water dispersed polymer in accordance with this invention.

Other suitable phosphated polymers include phosphated esters of alkyl alcohol, phosphated epoxidized oil, phosphated epoxidized polybutadiene copolymers, phosphated addition copolymers containing copolymerized phosphate monomer, phosphated addition polymer of copolymerized monomers, phosphated polyester, and phosphated epoxy-acrylic copolymer. Phosphated esters of alkyl alcohols can comprise a mixture of mono- and di-alkyl esters of phosphoric acid produced by reacting phosphoric acid with aliphatic alcohols containing between 2 and 20 carbon atoms and preferably between 4 and 8 carbon atoms as described in U.S. Pat. No. 2,005,619. Phosphated epoxidized oil comprises a phosphated ester of epoxidized oil with up to about 5% phosphoric acid. Epoxidized polybutadiene copolymer can be produced by reacting butadiene copolymer with phosphoric acid to produce a polybutadiene copolymer ester. Phosphated acrylic copolymers comprise phosphoric acid reacted with acrylic copolymer containing oxirane or hydroxyl functionality wherein the acrylic copolymer was produced by copolymerizing ethylenic monomers including glycidyl acrylate or methacrylate or hydroxyl functional monomer. Phosphated polyesters are hydroxyl terminated polyesters reacted with phosphoric acid wherein the polyesters ordinarily are polymers of dicarboxylic saturated and/or unsaturated acid esterified with simple glycols such as ethylene, propylene, diethylene, dipropylene, butane diols, and similar lower alkyl glycols. Phosphated addition copolymers can be prepared by copolymerizing ethylenically unsaturated monomers with a phosphated monomer such as phosphated hydroxy ethyl acrylate. The phosphated polymer can be a phosphated epoxy-acrylic copolymer comprising a phosphated epoxy resin coreacted with ethylenic monomers including acrylic monomers such as by in-situ polymerization of the monomers in the presence of the phosphated epoxy resin. The foregoing phosphated polymers preferably contain less than 5% coreacted phosphoric and ordinarily between 0.05% and 5% based on the weight of the phosphated polymer provided that the phosphated polymer does not contain appreciable amounts of excess molar phosphate reactant and, preferably, does not contain any free unreacted phosphate.

Phosphated esters of alkyl alcohol can comprise a mixture of mono- and di-alkyl esters of phosphoric acid produced by reacting phosphoric acid with aliphatic alcohols containing between 2 and 20 carbon atoms and preferably between 4 and 8 carbon atoms as suggested in U.S. Pat. No. 2,005,619. Other ester dispersed phosphated copolymers can be produced by polymerizing monomers in water containing an ionizing agent and a minor amount of organic cosolvent such as suggested in U.S. Pat. No. 4,218,356 wherein the polymers are phosphated. A phosphated resinous polyelectrolyte can be produced by providing an aqueous medium containing a cosolvent, adding the ionizing agent in advance of or concurrently with the monomers, polymerizing the monomer by free-radical polymerization until the water-dispersed resinous polyelectrolyte is formed, and then phosphating the remaining oxirane groups to produce water-dispersed polymer.

Phosphated epoxidized oil can comprise a phosphated ester of epoxidized oil or epoxidized polybutadiene copolymer by reacting the epoxidized polymer with up to about 5% phosphoric acid. Phosphated acrylic copolymers can be produced by reacting an acrylic copolymer containing oxirane or hydroxy functionality with phosphoric acid. The acrylic copolymer can be produced by reacting ethylenically unsaturated monomers, particularly including glycidyl acrylate or methacrylate or hydroxy functional monomers as well as other ethylenically unsaturated monomers such as methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate, substituted alkyl esters, for example, hydroxyalkyl esters such as hydroxyethyl and hydroxypropyl acrylate and methacrylate, styrene, alpha-methyl styrene, alpha-chloro styrene and vinyl toluene. Phosphated acrylic copolymers comprise phosphoric acid reacted with acrylic copolymer containing oxirane or hydroxy functionality wherein the acrylic copolymer comprises copolymerized ethylenic monomers including glycidyl acrylate or methacrylate or hydroxyl functional monomer.

Phosphated polyesters can be hydroxy terminated polyesters reacted with phosphoric acid wherein the polyesters ordinarily are dicarboxylic saturated or unsaturated acid esterified with simple glycols. Glycols include ethylene glycol, propylene glycol, diethylene glycol, dipropylene glycol, 1,3 or 1,4 butanediol, hexanediols, as well as minor amounts of polyols such as pentaeryethritol, triethylene glycol, trimethylol propane, or glycerol. The unsaturated dicarboxylic acid component can be alpha-beta unsaturated dicarboxylic acids or anhydrides such as maleic, fumaric, itaconic or the like. Saturated dicarboxylic acids or anhydrides include phthalic anhydride or acid, terephthalic acid, isophthalic acid, adipic acid, sebacic acid, succinic acid or similar saturated acids or anhydrides. Monocarboxylic acids or fatty acids can be added to a minor amount and can include lower alkyl acids as well as lauric acid, palmitic acid, myristic acid and stearic acids. The hydroxyl terminated polyesters is produced by reacting excess equivalents of glycol and polyol with lesser equivalents of carboxylic acid whereupon the excess hydroxyl groups are phosphated with phosphoric acid. Similarly, polyester containing terminal glycidyl groups can be reacted with phosphoric acid to produce a phosphated polyester.

Phosphated addition copolymers can be produced by copolymerizing ethylenic monomers with a phosphated hydroxy ethyl acrylate or similar phosphated monomers. Phosphated copolymer based on copolymerization of ethylenically unsaturated monomers in combination with phosphated ethylenically unsaturated monomer can be produced by polymerizing the ethylenic monomers previously described with the phosphate monomer in an aqueous polymerization process such as emulsion, suspension, aqueous ionic resinous polyelectrolyte dispersion, microemulsion, azeotropic and similar process previously described herein. Phosphated epoxy-acrylic copolymers can be produced by reacting ethylenic monomers including ethylenic carboxyl monomers in the presence of epoxy phosphate resin by in-situ polymerization to produce phosphated epoxy graft copolymer. Other phosphated epoxy-acrylic copolymers can be produced by reacting epoxy resin with preferred acrylic carboxyl copolymer in the presence of high amounts of amine to produce an epoxy-acrylic ester copolymer.

A highly desirable sprayable coating composition can be produced based on a self-curing water dispersed polymer and an aqueous polyelectrolyte polymer. Preferred compositions further include a phosphated polymer. The most preferred composition comprises a reactive self-curing emulsion polymer as the binder system in the coating along with additive amounts of aqueous polyelectrolyte polymer and epoxy phosphate. The polymeric mixture can broadly contain on a weight basis between 5% and 99% self-curing water dispersed polymer, 1% and 70% aqueous polyelectrolyte polymer, and 0 and 50% phosphated polymer. Preferred coating compositions of this invention contain a polymer blend on a weight basis comprising between 40% and 99% reactive self-curing water dispersed polymer, between about 1% and 30% aqueous polyelectrolyte copolymer, and between 0% and 30% and preferably 3% and 20% phosphated polymer. The foregoing matrix polymer compositions are then mixed with a water-dispersed cross-linking component generally referred to as aminoplast resins adapted to heat cure and cross link with the carboxyl functionality of the epoxy-acrylic copolymer mixture. On a polymer weight basis, the coating composition contains between 0% and 15% but preferably between 1% and 10% aminoplast cross-linking resin mixed with between 85% and 100% of the above-indicated matrix polymer compositions.

Referring next to the aminoplast cross-linking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts, which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beetle 80 (products of American Cyanamid which are methylated or butylated ureas). Other suitable aminoplast resins are of the type produced by the reaction of aldehyde and formal guanamines; ammeline; 2-chloro-4,6-diamine-1,3,5-triazine; 2-phenyl-p-oxy-4,6-diamino-1,3,5-tri-azine; and 2,4,6-triethyl-triamino-1,3,5-triazine. The mono, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

The water-dispersed coating compositions can be produced by mixing together the various water-dispersed polymers. The self-curing water dispersed polymer and the polyelectrolyte polymer are prepared separately in aqueous medium. The aminoplast polymer can be dispersed into water by mechanical mixing. The phosphate polymer can be prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like, as more particularly described in U.S. Pat. No. 4,212,781. Most preferred compositions comprise self-curing emulsion polymer such as latex, aqueous polyelectrolyte, and epoxy phosphate polymer. The amount of water contained in the coating composition containing reactive self-curing water dispersed polymer, the aqueous polyelectrolyte polymer, the phosphate polymer, and the aminoplast resin depends on the viscosity desired, which in turn, relates to the method of application. For spraying, preferably the coating composition contains between about 10% and 30% by weight polymeric solid is 70% to 90% water including other volatiles such as minor amounts of solvent. For application other than spraying, the aqueous polymeric dispersions can contain between about 10% and 40% by weight water. Organic solvents can be utilized to faciliate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein. Upon heat curing, the reactive self-curing water dispersed is believed to become reactive and self-curing wherein the alkyl chain of the alkoxy acrylamide splits from the alkylol acrylamide chain whereby the acrylamide chain of the water dispersed polymer reacts with the functional monomer groups of carboxyl, hydroxyl, or amido groups, or can react with the carboxyl or hydroxyl functionality in the polyelectric copolymer as well as the epoxy phosphate and/or the aminoplast cross-linking resin.

For metal sheet substrates intended as beverage containers and particuarly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade unless otherwise expressly noted.

EXAMPLE 1

Preparation of Self-Curing Water Dispersed Polymers

A two stage thermosetting acrylic emulsion copolymer containing styrene/ethyl acrylate/methacrylic acid/N-isobutoxy methylol acrylamide was prepared by loading 100 parts of deionized water and 0.80 parts sodium dihexyl sulfosuccinate into the reactor and heating under nitrogen sparge with agitation to 76°–77° C. At equilibriated reaction temperature the nitrogen sparge was removed and 0.10 parts ammonium bicarbonate added. A mixture of 3.0 parts styrene and 2.0 parts ethyl acrylate was then added to the reactor and emulsified 10 minutes, whereupon 0.25 parts ammonium persulfate were added and allowed to react 20 minutes before starting monomer stage number one.

Monomer stage number one contained 33.0 parts styrene, 26.5 parts ethyl acrylate and 3.50 parts methacrylic acid. This monomer stage was added at a constant rate to the reactor so that addition was complete after 3.0 hours. Monomer stage number two consisted of 14.0 parts styrene, 11.5 parts ethyl acrylate, 1.5 parts methacrylic acid and 5.0 parts N-isobutoxy methylol acrylamide, and was added continuously to the reactor during 1.25 hours. After monomer mix number two was completed, the batch was held for 2 hours at the reaction temperature before cooling and filtration.

Monomer stage sizes are not necessarily confined to those described in this example. Satisfactory spray characteristics were obtained when the first stage/second stage ratio was maintained at a weight ratio of between 25/75 and 75/25.

EXAMPLE 2

Preparation of Water Dispersed Polyelectrolyte Polymers

A 5 L flask equipped with a thermometer, a condenser, a stirrer, and a $N_2$ inlet was charged with a mixture of 1000 gms. of DI water and 114.6 gms. of dimethyl aminoethanol. The mixture was heated to 85° C. A monomer mixture containing 548 gms. of styrene, 487.1 gms. of ethyl acrylate, 121.7 gms. of methacrylic acid, 24.3 gms. of benzoin, 379.5 gms. of butyl cellosolve, 379.5 gms. of n-butanol, 60.9 gms. of N(isobutoxy methyl) acrylamide, and 34.8 gms. of tert-butyl hydroperoxide was added over 4 hrs. When the addition of monomer mixture was completed, the reaction mixture was held at 85° C. for 1 hour. Then, 900 gms. of DI water was added and followed by a mixture of 100 gms. of DI water and 34.8 gms. of tert-butyl hydroperoxide. The reaction mixture was held at 85° C. for another 2 hours to complete the polymerization.

EXAMPLE 3

Epoxy Phosphate Synthesis

Procedure A

The epoxy phosphate was prepared according to the following procedure: 1005 gms. of epoxy resin (DER-333) and 340.5 gms. of bisphenol-A and 178 gms. of butyl cellosolve were heated to 140° C. in a 5 L round bottom flask equipped with stirrer, condenser and thermometer. When the temperature was at 140° C., the heat was turned off and the exotherm raised the temperature to 188° C. After the exotherm was peak, the batch was kept at 175° C. for an additional 5 hours. Periodic testing for viscosity and percent oxirane was made. Target oxirane value was about 2.28% and viscosity at 40% non-volatile between I-J. When these values were obtained, 227 gms. of butyl cellosolve were added, and the batch was cooled to 120° C. When the batch temperature was at 120° C., a mixture of 63.64 gms. of 85% phosphoric acid and 20 gms. of butyl cellosolve was added dropwise. The exotherm raised the batch temperature to 145° C. The batch was cooled to 120° C. and held for a half hour. Twenty-seven gms. of water were added to the reaction mixture and the batch was held at 120° C. for an additional 4 hours. After the hold, 241 gms. of butanol, 78 gms. of butyl cellosolve, 122.5 gms. of dimethylethanolamine and 2,500 gms. of deionized water were added respectively. The final mixture was agitated for 2 hours to obtain a stable emulsion.

Procedure B

Epoxy phosphate was produced by adding 816 gms. of epoxy resin (DER-333), 384 gms. of bisphenol-A, and 163 gms. of butyl cellosolve in a 5 L round bottom flask equipped with a stirrer, condenser, and thermometer and heated to 140° C. When the temperature was at 140° C., the heat was turned off and the exotherm raised the temperature to 155° C. After the exotherm was peak, the heat was turned back on to keep the temperature at 175° C. for an additional 2 hours. Periodic testing for viscosity and percent oxirane were made. Oxirane value was about 0.87% and the viscosity was X-Y at 40% NV in butyl cellosolve. When these values were obtained, 163 grams of butyl cellosolve were added, and the batch was cooled to 125° C. Mixture of 14.2 gms. of polyphosphoric acid (FMC) and 50 gms. of butyl cellosolve was added over 45 minutes, 30 gms. of extra butyl cellosolve was added as line rinse. The batch was held at 120° C. for 1 hour. Then 23 gms. of DI water were added to the reaction mixture and the held batch was at 120° C. for an additional 2 hours. After the hold time, the heat was turned off and 203 gms. of butanol were added over 8 minutes. 1550 gms. of DI water and 17.4 gms. of dimethyl ethanolamine were heated in a letdown container to 60° C. The above resin was dropped slowly into water amine mixture to form a suitable emulsion. The resulting emulsion was adjusted to 25% NV by adding 1000 grams of DI water and stirring continued for 2 hours to insure an homogeneous mixture.

In accordance with the Procedure A or B, various epoxy phosphates were produced with the following molecular weight variation.

TABLE 1

| Molecular Weight | % Oxirane | % Acid | % NV | Emulsion |
|---|---|---|---|---|
| 9410 | 0.34 | 0.35 | 30.3 | Good |
| 6150 | 0.52 | 0.39 | 34.4 | Good |
| 4000 | 0.80 | 0.92 | 34.9 | Good |
| 3080 | 1.04 | 0.92 | 32.8 | Good |
| 2500 | 1.26 | 2.30 | 23.0 | Good |
| 1400 | 2.28 | 4.20 | 22.4 | Good |

EXAMPLE 4

Blend Composition

To a 5 L flask equipped with a condenser and a stirrer, 1514 gms. of self curing water dispersed polymers were added along with 463 gms. of DI water. The mixture was mixed for 15 minutes. Next, 200.3 gms. of epoxy phosphate from Example 3 was added and rinsed with 200 gms. of DI water. The resulting mixture was mixed for 1 hr., then 379.1 gms. of water dispersed polyelectrolyte polymers from Example 2 was added and rinsed with 200 gms. of DI water. The mixture was stirred for 1 hr. A mixture of 13 gms. of n-butanol and 29.1 gms. of Cymel 303 was then added and followed by 100 gms. of DI water. The resulting mixture was mixed for 2 hours and then filtered.

The resulting polymeric mixture was cured and provided good interior can coating.

The foregoing examples and descriptions are illustrative and set forth preferred embodiments of the invention comprising a resinous polyelectrolyte polymer mixed with a self-curing water dispersed polymer and a phosphated polymer to provide excellent sprayable water based polymeric compositions useful as interior can coating compositions, but are not intended to be limiting except by the appended claims.

We claim:

1. A water-dispersed coating composition containing an intermixture of water-dispersed polymers comprising on a polymer solids weight basis:
   between 1% and 70% of resinous polyelectrolyte copolymer produced by copolymerizing ethylenically unsaturated monomers, including carboxyl or hydroxyl functional group monomer in water containing an ionizing agent wherein at least 20% by weight of said carboxyl or hydroxyl functional groups are ionized by said ionizing agent;
   between 5% and 99% of a reactive self-curing polymer containing copolymerized ethylenically unsaturated monomers comprising (i) alkylol acrylamide, (ii) functional monomers comprised of reactive carboxy, hydroxyl, amine, or amide, and (iii) other ethylenically unsaturated monomers; and
   between 0% and 50% phosphated polymer.

2. The composition in accordance with claim 1 wherein the polymer mixture comprises:
   between 1% and 30% aqueous polyelectrolyte polymer, between 40% and 99% of said reactive self-curing water dispersed polymer, and between 0% and 30% phosphated polymer.

3. The composition in accordance with claim 2 wherein the polymer mixture contains between 3% and 20% phosphated polymer.

4. The composition in accordance with claim 2 wherein the polymer mixture further contains between 1% and 10% aminoplast resin.

5. The composition in accordance with claim 1 wherein the resinous polyelectrolyte copolymer contains copolymerized carboxyl polymer and the copolymer was produced in the presence of an ionizing agent selected from a primary, secondary, or tertiary amine.

6. The composition in accordance with claim 1 wherein the resinous polyelectrolyte copolymer contains copolymerized hydroxyl monomer and the copolymer was produced in the presence of an ionizing agent selected from an organic carboxylic acid or an inorganic acid.

7. The composition in accordance with claim 1 wherein said polyelectrolyte copolymer contains by weight between 5% and 35% copolymerized carboxyl monomer or hydroxyl monomer.

8. The composition in accordance with claim 1 wherein the polyelectrolyte copolymer containing functional groups wherein between 25% and 40% of available ionizable functional groups are ionized by said ionizing agent.

9. The composition in accordance with claim 3 wherein the phosphated polymer is an epoxy phosphate polymer.

10. The composition in accordance with claim 9 wherein the phosphated epoxy polymer contains between 0.1 and 1 equivalent of phosphate per equivalent of epoxide.

11. The composition in accordance with claim 9 wherein the phosphated epoxy polymer contains on a weight basis between 0.05% and 5% coreacted phosphate.

12. The composition in accordance with claim 9 wherein the epoxy phosphate polymer has a molecular weight between 200 and 10,000.

13. The composition in accordance with claim 9 wherein the phosphate polymer comprises a phosphated ester of alkyl alcohol.

14. The composition in accordance with claim 9 wherein the phosphated polymer comprises a phosphated epoxidized oil.

15. The composition in accordance with claim 9 wherein the phosphated polymer comprises an epoxidized polybutadiene copolymer.

16. The composition in accordance with claim 9 wherein the phosphated polymer comprises a phosphated addition polymer of copolymerized monomers.

17. The composition in accordance with claim 9 wherein the phosphated polymer comprises a phosphated polyester.

18. The composition in accordance with claim 9 wherein the phosphated polymer comprises a phosphated epoxy-acrylic copolymer.

* * * * *